April 26, 1932. H. TESSANDORI 1,855,369
PRESERVE FRUIT SQUEEZER
Filed Nov. 13, 1929   2 Sheets-Sheet 1
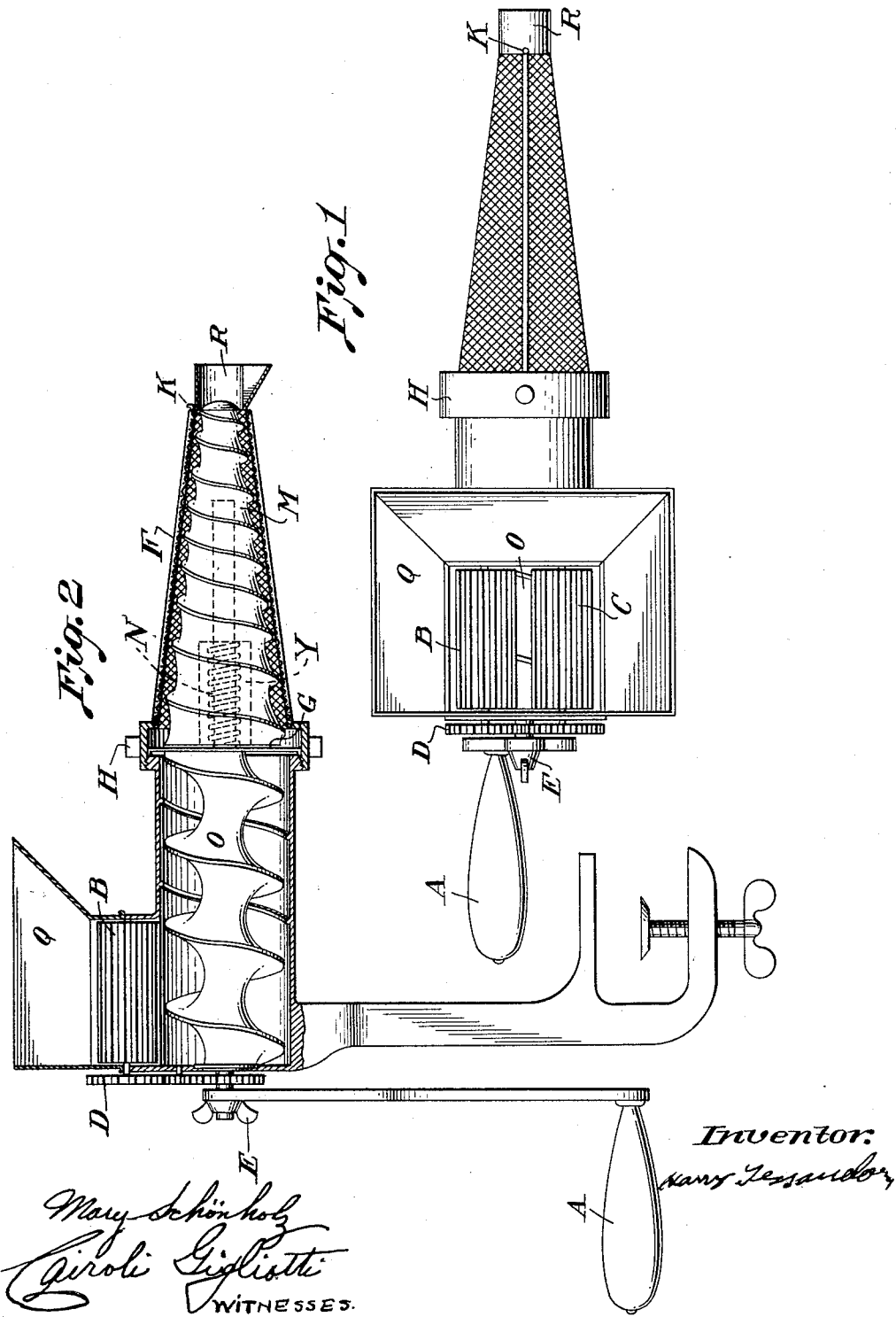

April 26, 1932. H. TESSANDORI 1,855,369
PRESERVE FRUIT SQUEEZER
Filed Nov. 13, 1929 2 Sheets-Sheet 2
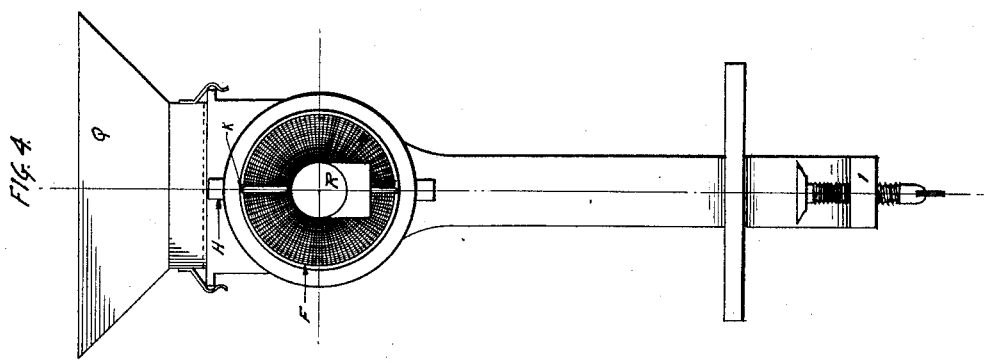
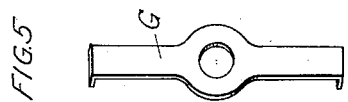
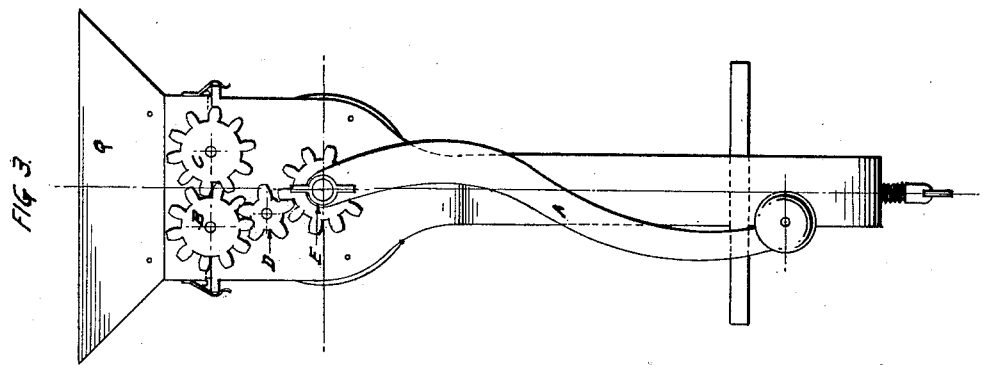

Patented Apr. 26, 1932

1,855,369

UNITED STATES PATENT OFFICE

HARRY TESSANDORI, OF CHICAGO, ILLINOIS

PRESERVE FRUIT SQUEEZER

Application filed November 13, 1929. Serial No. 406,853.

This invention relates to improvements in fruit crushers and squeezers, a useful, easily operated, economical and safe device primarily adapted to separate the meat and juice of fruits and vegetables.

An object of the invention comprehends a screw shaped shaft in two pieces, one of them revolving from left to right but having no longitudinal movement, the other one revolving also from left to right but being so constructed as to move also longitudinally in order to regulate automatically the pressure and the movement of said part of the shaft, to remove friction and to give a uniform, smooth and safe movement to the apparatus.

A further object of the invention consists in the avoidance of waste, the pulp and juice of fruits and vegetables being separated thoroughly from the peel, core and seed, not a single particle of pulp and juice being lost. A further object of the invention consists in the harmonious working of all its parts without jolts or shocks to the operator who handles it.

With the above and other objects in view, the invention further consists of the following novel features and details of construction to be hereinafter more fully described, illustrated in the accompanying drawings and pointed out in the appended claim.

Figure 1, is a top view of the apparatus. Figure 2 shows it in its sectional form and inside fittings, with half of the housing removed. Figure 3 shows an end view of the handle of the apparatus and the system of cog wheels necessary to transmit movement to the several parts of the apparatus. Figure 4 shows the front view of the apparatus. Figure 5 is a detail view of the middle support.

The apparatus functions in the following manner:

Fig. 4 shows in $i$ the part of the apparatus which is used to fasten it on kitchen tables, boards or benches, upon which it is made to operate. Turning handle $a$ (Figs. 1—2—3—4), shaft $e$ (Figs. 1—2—3), on which said handle $a$ is fastened by an appropriate two winged screw, as shown in Fig. 2, revolves and, with it, axis $o$ (which is spiral shaped). To spiral shaped axis $o$ (Fig. 2) is connected, by means of square appendix $y$ (Fig. 2), axis $m$, also spiral shaped, (Fig. 3). Axis $m$ is bored inside to permit the introduction of appendix $y$, on which it rests. The rear part of appendix $y$ is cylindrical in form, and receives spring $n$, which rests at one end against middle support $g$ (Fig. 5) inserted in cavities existing in band $h$ (Figs. 1—2—4) of the funnel-like metal covering of the apparatus, and at the other end against the internal edge of cavity contained in shaft $m$.

Spiral $o$ (Fig. 2) has an additional support in flange $g$ (Fig. 5) which has a circular opening in the center by means of which it permits the passage of appendix $y$ of spiral shaft $o$, (Fig. 2). Axis $m$ (Figure 2) rests on its extreme part on curve of piece $r$ (Figs. 1—2— and 3), which is provided with a circular opening through which peel, seed and core of fruit are ejected. The horizontal and funnel-like box $f$ (Figs. 1, 2 and 4) in which axis $m$ is housed (Fig. 2) is provided with sieve-like perforation all around in order to permit, through its small holes, the pulp and the juice of fruit, squeezed by the apparatus, to drip out.

Fig. 2 shows the built on, washer-like edge of spiral $o$, which rotates with it and acts as its rear support and moderator, while Fig. 2 shows the shape of front edge of spiral $o$.

Cog wheels $b$, $c$, $d$, transmit the movement of rotation to revolving shaft B and C (Fig. 1), in a direction from the outside to the inside of the central part of box Q (Figs. 1, 2, 3, 4) in which fruit to be squeezed is placed, to be ground and smashed before they drop, so crushed, in chamber below where axis $o$ (Fig. 2) revolves, squeezing them out of pulp and juice in the secondary process of the squeezing operation and then pushing them in the chamber of axis $m$ where the final process of separating the pulp and juice of the fruit so crushed and squeezed takes place.

The operation is effected in this manner: Turning handle $a$ (Figs. 1, 2, 3 and 4) axis $e$ to which spiral or screw shaped axis $o$ (Fig. 2) is connected, as already explained, revolves and squeezes pulp and juice from smashed fruit brought into the chamber in which axis *o* revolves, by the action of rollers B and C, (Fig. 1). Cog wheel D (Fig. 3) controls the movement of cog wheel B (Fig. 3) which is connected with roller B (Fig. 1) and determines the movement, in the opposite direction, of cog wheel C (Fig. 3) which is connected with roller C (Fig. 1). The movement of cog wheel D is determined by the movement of cog wheel E, which is inserted in and forms part of extreme point E of axis *o*. The revolving of handle, or arm *a*, determines therefore the simultaneous movement of the entire apparatus, or device.

As soon as the apparatus starts to function, stoneless fruit are placed in box Q (Figs. 1, 2, 3, 4). Rollers B and C (Fig. 1) driving them in, smash and grind them before they are sent into chamber below where axis *o* continues the operation of mashing and squeezing them, and by its movement, which is followed by the movement of axis *m* (Fig. 2) completes the smashing and squeezing of pulp and juice which are forced out through the little holes or perforated part, of box *f* (Fig. 1), in which axis *m* revolves. The peel, core and seed of fruit, so smashed and squeezed out of pulp and juice, are carried along, to the extreme edge of box *f*, and ejected, by means of the pressure of axis *m*, through circular hole in R (Figs. 1, 2, 4). Should the accumulation of peels, cores, or seeds of fruit clog somewhat the exit in R, the resulting pressure will force axis *m* to overcome the tension of spring *n* in the direction of axis *o*, in this manner increasing the opening at R, and permitting conglomerated peel, core and seeds to escape.

The work is smoothly and uniformly done. There are no jolts or increase in pressure or resistance during the operations of the apparatus which is stopped only when the squeezing process is complete.

All parts are easily detachable for cleansing purposes, and are easy to keep clean and in a sanitary condition. In fact, all pieces are so constructed as to be disconnected, cleansed and dried out with ease. No mechanical skill is required in the operator. Box *f*, (Figs. 1 and 2) can be opened by the removal of pin *k* without effort, or pressure.

I am aware that prior to my invention, preserve fruit squeezers have been made with screw shaped shafts operating in conjunction with crushing rollers, or without, in the preliminary stage of the crushing and squeezing process and having at one extremity of the screw shaped shaft a spring as a safety device. I therefore do not claim such a combination broadly, but

I claim:

The combination in a preserve fruit squeezer of a rotary crushing and squeezing shaft made in two parts, the rear part of the shaft having an extension with circular and quadrangular portions, a supporting member between the two parts of said shaft provided with a circular opening in which the circular portion of said extension is supported, the front part of the shaft having a quadrangular opening in which the quadrangular portion of said extension is inserted, and a spring between the two parts of the shaft to regulate the movement of the front part of the shaft.

In testimony whereof I affix my signature.

HARRY TESSANDORI.